US009275637B1

(12) United States Patent
Salvador et al.

(10) Patent No.: US 9,275,637 B1
(45) Date of Patent: Mar. 1, 2016

(54) WAKE WORD EVALUATION

(71) Applicant: Rawles LLC, Wilmington, DE (US)

(72) Inventors: Stan Weidner Salvador, Tega Cay, SC (US); Jeffrey Paul Lilly, Seattle, WA (US); Frederick V. Weber, New York, NY (US); Jeffrey Penrod Adams, Tyngsborough, MA (US); Ryan Paul Thomas, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 13/670,316

(22) Filed: Nov. 6, 2012

(51) Int. Cl.
G10L 21/00 (2013.01)
G10L 25/00 (2013.01)
G10L 15/06 (2013.01)
G10L 15/00 (2013.01)
G10L 15/01 (2013.01)

(52) U.S. Cl.
CPC ............... G10L 15/01 (2013.01); G10L 15/06 (2013.01)

(58) Field of Classification Search
USPC ........................................ 704/231–257, 275
See application file for complete search history.

(56) References Cited

U.S. PATENT DOCUMENTS 5,983,186 A * 11/1999 Miyazawa et al. ............ 704/275
6,070,140 A * 5/2000 Tran .............................. 704/275
6,163,768 A * 12/2000 Sherwood et al. ............ 704/235
7,418,392 B1 8/2008 Mozer et al.
7,720,683 B1 5/2010 Vermeulen et al.
7,774,204 B2 8/2010 Mozer et al.
8,452,597 B2 * 5/2013 Bringert et al. ............... 704/251
2003/0187643 A1 * 10/2003 Van Thong et al. ........... 704/254
2006/0064177 A1 * 3/2006 Tian et al. ........................ 700/1
2012/0223885 A1 9/2012 Perez
2013/0289994 A1 * 10/2013 Newman et al. .............. 704/254

FOREIGN PATENT DOCUMENTS

WO    WO2011088053    7/2011

OTHER PUBLICATIONS

Harati, Amir et al., "Keyword Search Assessment", Institute for Signal and Information Processing, Department of Electrical Engineering, Jan. 2012, 18 pages.
Pinhanez, "The Everywhere Displays Projector: A Device to Create Ubiquitous Graphical Interfaces", IBM Thomas Watson Research Center, Ubicomp 2001, 18 pages.

* cited by examiner

Primary Examiner — Jesse Pullias
(74) Attorney, Agent, or Firm — Lee & Hayes, PLLC

(57) ABSTRACT

Natural language controlled devices may be configured to activate command recognition in response to one or more wake words. Techniques are provided to receive a candidate word for evaluation as a wake word that activates a natural language control functionality of a computing device. The candidate word may include one or more words or sounds. Values for multiple wake word metrics are then determined. The candidate word is evaluated based on the various wake word metrics.

35 Claims, 6 Drawing Sheets

WAKE WORD EVALUATION

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech.

The use of natural language input to interact with computing devices presents many challenges. One challenge concerns ensuring that the natural language speech is intended to be a command to be executed by the computing device. In general, the user may indicate that natural language input is intended to be a command by clicking on a window, pressing an icon on a touch screen, or otherwise explicitly indicating that the natural language input is a command using a non-natural language input. However, in systems in which a user gives natural language commands to a computing device without first indicating the natural language input includes commands, the computing device may be unable to act on the commands. In other cases, the computing device may incorrectly interpret background noises or background speech that is not intended to be natural language input as a natural language command.

Accordingly, there is a need for techniques to improve the user experience in interacting with natural language control devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
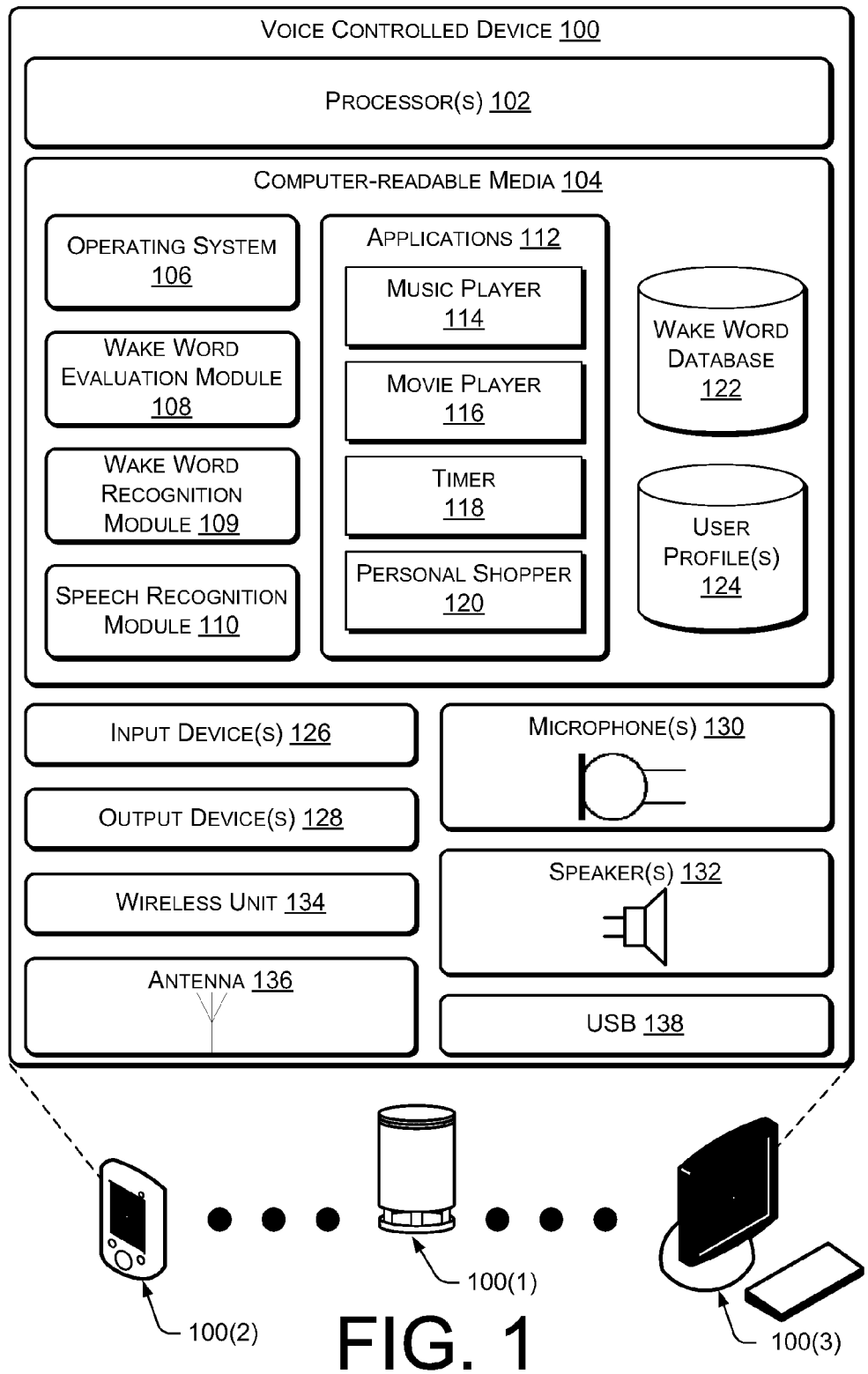
FIG. 1 shows a functional block diagram of selected components implemented at a voice controlled device.

Some computing devices require users to explicitly indicate that a natural language command is about to be input to the device using a non-natural language input. For instance, a user may be asked to press a button or touch a soft key on a graphical user interface to inform the device that he or she intends to speak a command. However, as human-machine interfaces evolve, users may wish to provide natural language commands to the device itself without resorting to supplemental non-natural language input.

Natural language commands may indicate an act or command to be executed. For example, a user may ask "What time is it?" Without a non-natural language input, it is confusing for the computing device to know whether the user is talking to the device, or to another person in the room. Accordingly, the device may act on this command. If the user was merely asking another person, the device's execution of the command to provide an answer may interrupt the user's conversation in an unintended fashion. That is, devices that do not include a non-natural language input to activate the natural language recognition functionality may recognize the person to person question as a command to the computing device. As a result, a device may act in a manner unexpected by the user even though the device correctly recognized the command. This may become tedious and can distract from the user experience.

This disclosure provides techniques and systems for utilizing a natural language input, hereinafter termed a "wake word", to trigger or enable a natural language command recognition functionality of a natural language controlled device. More particularly, this disclosure provides techniques and systems for evaluating candidate wake words to determine their suitability to be wake words for the natural language controlled device. Based on the evaluation, one or more suitable wake words may be chosen from the candidate wake words. Although referred to herein as a "wake word," a "wake word" may comprise more than one actual word and thus may be a phrase.

Voice interactions are one type of natural language command. Thus, a user may talk to a computing device and expect the device to appropriately act on his or her spoken commands. Natural language commands are not limited to speech and may also be provided as typed commands, handwritten commands, etc. As such, while example implementations described herein refer to voice controlled devices, the implementations are not limited thereto and may include natural language input controlled devices in general.

In some implementations, the evaluation of candidate wake words is performed by determining a plurality of wake word metrics for the candidate wake words. Some examples of wake word metrics include a word frequency score metric, a false alarm score metric, a false alarm count metric, a similarity metric, a ease of recognition metric, a taboo word metric, a ease of pronunciation metric, and a lack of ambiguity of pronunciation metric. Illustrative implementations for evaluating candidate wake words for suitability as wake words are described below. However, the described techniques may be implemented in many other contexts and situations in which a user provides commands to a computing device.

Wake words, and by extension candidate wake words are not limited to any particular set or group of words, phrases, etc. For example, some implementations may allow candidate wake words or the words that make up the candidate wake words to be selected from be a set of all words in a language, may evaluate all words in the language as candidate wake words, may allow user defined words (such as in the case of made up words or proposed trade names for the voice control device, etc.), may randomly select or generate words to be evaluated as candidate wake words (e.g. using a computer program to randomly or programmatically group subword units into sets for evaluation as candidate wake words), and so forth.

A metric may be used to determine a value that provides an indication of favorability, suitability, a match or a correspondence, etc. for use of a candidate wake word as a wake word.

For example, a value may represent, without limitation, a probability in the range of zero to one, a probability represented as a percentage, a log probability, a likelihood, a log likelihood, etc. In some implementations, a value may be referred to as a score. For clarity in the following, a value may indicate a result from a single metric, and a score may indicate an overall value based on a combination of values from more than one metric.

In some implementations, values may be combined to create an overall score. For example, an overall wake word score may be determined for a candidate wake word based, at least in part, upon the values of one or more wake word metrics. For example, in implementations including a word frequency score metric and a false alarm score metric, the value of each metric may be scaled to a logarithmic zero to one scale and averaged to determine the overall wake word score. Of course, other processes may be used to perform the overall evaluation of the candidate wake words (e.g., manual review of the individual wake word metrics).

Further, although the discussion herein is directed to evaluating candidate wake words to be wake words for electronic devices, other evaluations may be performed. For example, in some implementations, the evaluation of the candidate words may evaluate the candidate words for suitability to be brand names, trade names, catch phrases, etc.

Illustrative Device

FIG. 1 shows selected functional components of a natural language input controlled device, specifically, voice controlled device 100. The voice controlled device 100 may be implemented as a standalone device 100(1) that is relatively simple in terms of functional capabilities with limited input/output components, memory, and processing capabilities. For instance, the voice controlled device 100(1) does not have a keyboard, keypad, or other form of mechanical input. Nor does it have a display or touch screen to facilitate visual presentation and user touch input. Instead, the device 100(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 100(1) is through voice input and audible output.

The voice controlled device 100 may also be implemented as a mobile device 100(2) such as a smart phone or personal digital assistant. The mobile device 100(2) may include a touch-sensitive display screen and various buttons for providing input as well as additional functionality such as the ability to send and receive telephone calls. Alternative implementations of the voice control device 100 may also include configuration as a personal computer 100(3). The personal computer 100(3) may include a keyboard, a mouse, a display screen, and any other hardware or functionality that is typically found on a desktop, notebook, netbook, or other personal computing devices. The devices 100(1), 100(2), and 100(3) are merely examples and not intended to be limiting, as the techniques described in this disclosure may be used in essentially any device that has an ability to recognize speech input.

In the illustrated implementation, the voice controlled device 100 includes one or more processors 102 and computer-readable media 104. The computer-readable media 104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 104 may be implemented as computer-readable storage media ("CRSM"), which may be any available physical media accessible by the processor(s) 102 to execute instructions stored on the memory 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 102.

Several modules such as instruction, datastores, and so forth may be stored within the computer-readable media 104 and configured to execute on the processor(s) 102. A few example functional modules are shown as applications stored in the computer-readable media 104 and executed on the processor(s) 102, although the same functionality may alternatively be implemented in hardware, firmware, or as a system on a chip (SOC).

An operating system module 106 may be configured to manage hardware and services within and coupled to the device 100 for the benefit of other modules. A wake word evaluation module 108 may be configured to evaluate candidate wake words and accept a selection of a candidate wake word for use by the device 100 as a wake word. Alternatively, wake word evaluation module 108 may be configured to automatically select a candidate wake word to be used by the device 100 as a wake word. A wake word recognition module 109 and a speech recognition module 110 may employ any number of conventional speech recognition techniques, such as use of hidden Markov models and Gaussian mixture models, to interpret voice input. For example, the speech recognition module 110 may employ large vocabulary speech recognition techniques and the wake word recognition module may include speech or phrase recognition particular to the wake word. In some implementations, the wake word recognition module 109 may employ a hidden Markov model that represents the wake word itself. In some implementations, the speech recognition module 110 may initially be in a passive state in which the speech recognition module 110 does not recognize or respond to speech. While the speech recognition module 110 is passive, the wake word recognition module 109 may recognize or respond to wake words. Once the wake word recognition module 109 recognizes or responds to a wake word, the speech recognition module 110 may enter an active state in which the speech recognition module 110 operates to detect any of the natural language commands for which it is programmed or to which it is capable of responding. While in the particular implementation shown in FIG. 1, the wake word recognition module 109 and the speech recognition module 110 are shown as separate modules, in other implementations, these modules may be combined.

The voice controlled device 100 may also include a plurality of applications 112 stored in the computer-readable media 104 or otherwise accessible to the device 100. In this implementation, the applications 112 are a music player 114, a movie player 116, a timer 118, and a personal shopper 120. However, the voice controlled device 100 may include any number or type of applications and is not limited to the specific examples shown here. The music player 114 may be configured to play songs or other audio files. The movie player 116 may be configured to play movies or other audio visual media. The timer 118 may be configured to provide the functions of a simple timing device and clock. The personal shopper 120 may be configured to assist a user in purchasing items from web-based merchants.

Datastores present may include a wake word database 122 and one or more user profiles 124 of users that have interacted with the device 100. The wake word database 122 may store data that is used in the evaluation of candidate wake words by the wake word evaluation module 108. In implementations in which the candidate wake words were evaluated and/or selected previously or in advance, the wake word database 122 may store the candidate wake words or a subset of the candidate wake words (e.g. a subset of candidate wake words that were determined to be suitable for use a wake words), values of the metrics determined for the candidate wake words, models for the wake words (such as hidden Markov models and Gaussian mixture models), default wake words, etc. The user profile(s) 124 may include user characteristics, preferences (e.g., user specific wake words), usage history, library information (e.g., music play lists), online purchase history, and other information specific to an individual user.

Generally, the voice controlled device 100 has input devices 126 and output devices 128. The input devices 126 may include a keyboard, keypad, mouse, touch screen, joystick, control buttons, etc. Specifically, one or more microphones 130 may function as input devices to receive audio input, such as user voice input. The output devices 128 may include a display, a light element (e.g., LED), a vibrator to create haptic sensations, or the like. Specifically, one a more speakers 132 may function as output devices to output audio sounds.

A user may interact with the device 100 by speaking to it, and the microphone 130 captures the user's speech. The device 100 can communicate back to the user by emitting audible statements through the speaker 132. In this manner, the user can interact with the voice controlled device 100 solely through speech, without use of a keyboard or display.

The voice controlled device 100 might further include a wireless unit 134 coupled to an antenna 136 to facilitate a wireless connection to a network. The wireless unit 134 may implement one or more of various wireless technologies, such as Wi-Fi, Bluetooth, RF, and so on. A USB 138 port may further be provided as part of the device 100 to facilitate a wired connection to a network, or a plug-in network device that communicates with other wireless networks. In addition to the USB port 138, or as an alternative thereto, other forms of wired connections may be employed, such as a broadband connection.

Accordingly, when implemented as the primarily-voice-operated device 100(1), there may be no input devices, such as navigation buttons, keypads, joysticks, keyboards, touch screens, and the like other than the microphone(s) 130. Further, there may be no output such as a display for text or graphical output. The speaker(s) 132 may be the main output device. In one implementation, the voice controlled device 100(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 100(1) may be implemented as an aesthetically appealing device with smooth and rounded surfaces, with one or more apertures for passage of sound waves. The device 100(1) may merely have a power cord and optionally a wired interface (e.g., broadband, USB, etc.). Once plugged in, the device may automatically self-configure, or with slight aid of the user, and be ready to use. As a result, the device 100(1) may be generally produced at a low cost. In other implementations, other I/O components may be added to this basic model, such as specialty buttons, a keypad, display, and the like.

Figure 2:
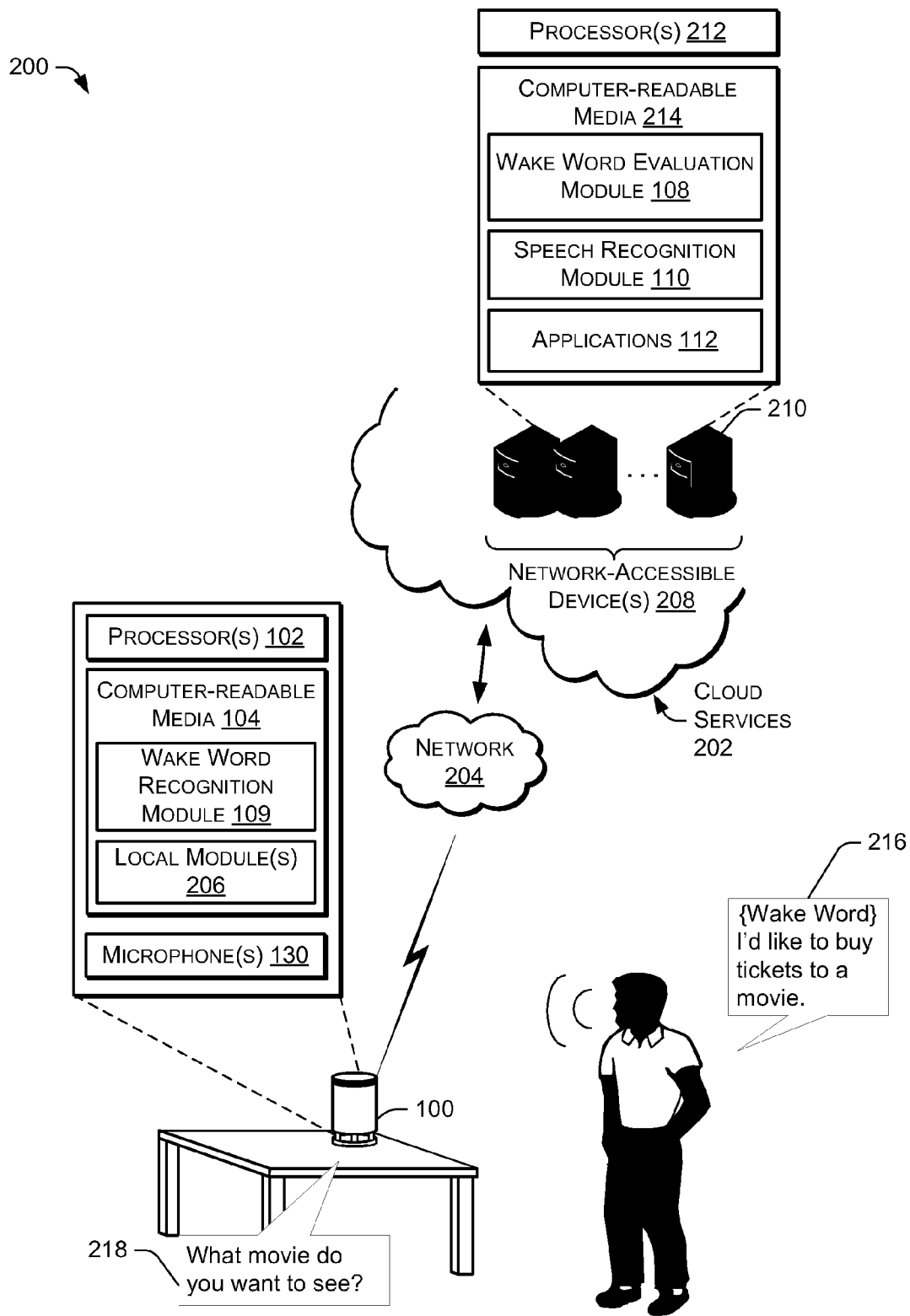
FIG. 2 shows a functional block diagram of selected components implemented at remote cloud services accessible via a network.

FIG. 2 is an architecture 200 showing an alternative implementation of the device 100 in which some or all of the functional components of the device 100 may be provided by cloud services 202. The cloud services 202 generally refer to a network accessible platform implemented as a computing infrastructure of processors, storage, software, data access, and so forth that is maintained and accessible via a network 204 such as the Internet. Cloud services 202 may not require end-user knowledge of the physical location and configuration of the system that delivers the services. Common expressions associated with cloud services include "on-demand computing", "software as a service (SaaS)", "platform computing", "network accessible platform", and so forth.

In this implementation, the device 100 may be configured with the wake word recognition module 109 and one or more local modules 206 available in the computer-readable media 104 that provide instructions to the processor(s) 102. The local modules 206 may provide basic functionality such as creating a connection to the network 204 and initial processing of data received from the microphone 130 and controlling an output device such as a speaker. Other functionality associated with the device and system described in FIG. 1 may be provided by the remote cloud services 202.

The cloud services 202 include one or more network-accessible devices 208, such as servers 210. The servers 210 may include one or more processors 212 and computer-readable media 214. The processor(s) 210 and the computer-readable media 212 of the servers 210 are physically separate from the processor(s) 102 and computer-readable media 104 of the device 100, but may function jointly as part of a system that provides processing and memory in part on the device 100 and in part on the cloud services 202. These servers 210 may be arranged in any number of ways, such as server farms, stacks, and the like that are commonly used in data centers.

Furthermore, the wake word evaluation module 108, the speech recognition module 110, and/or any of the applications 112 shown in FIG. 1 may be located in the computer-readable media 214 of the cloud services 202. Thus, the specific location of the respective modules used to implement the features contained in this disclosure is not limiting and the discussions below are equally applicable to any implementation that includes a local device, a cloud-based service, or combinations thereof. In implementations in which the speech recognition module 110 is located in the computer-readable media 214 of the cloud services 202, the wake word recognition module 109 and the local modules 206 may further provide the functionality to recognize wake words and to forward voice input to the speech recognition module 110 in response to the recognition of a wake word.

In general, in implementations in which the voice controlled device 100 allows for a user to define or select a wake word (as opposed implementations in which wake words are predefined or otherwise not user selectable), the architecture 200 may operate as follows. During a setup of the voice controlled device 100, the voice controlled device 100 may prompt the user for a candidate wake word or a set of candidate wake words. The local modules 206 may forward the candidate wake word or set of candidate wake words to the cloud services 202. The wake word evaluation module 108 of the servers 210 may evaluate the candidate wake word or set of candidate wake words based on a plurality of wake word metrics and determine an overall wake word score for each candidate wake word. The scores may then be returned to the voice controlled device 100. Based on the received overall scores, the user may be presented a ranked list of the candidate wake words or of the candidate wake words deemed acceptable (e.g. candidate wake words with a overall wake word score above a threshold). The user may then select a candidate wake word to use in operating the voice controlled device 100. Alternatively, if no candidate wake word is deemed acceptable, the user may be prompted for additional candidate wake words and the process may repeat.

Following the setup of the voice controlled device 100, the operation of the system 200 may be as follows. The user speaks a phrase 216 including the wake word and a natural language command, "I'd like to buy tickets to a movie". The wake word recognition module 109 of the device 100 recognizes the wake word portion of phrase 216. The local module(s) 206 may then begin sending the audio input received at the microphone(s) 130 to the cloud services 202 for recognition of one or more natural language commands. Thus, the voice controlled device 100 is activated by the wake word and sends the phrase 216 to the cloud services 202. The servers 210 of the cloud services 202 process the natural language command portion of phrase 216, "I'd like to buy tickets to a movie" For example, the speech recognition module 110 of the servers 210 may recognize the received natural language command and send the appropriate response to the voice controlled device 100. As illustrated in FIG. 2, the device 100 receives and outputs the phrase 218, "What movie do you want to see?" The user may respond with the name of the movie and so on. Thus, the voice controlled device 100 may be operated while limiting the likelihood that the voice controlled device 100 will respond to background speech not intended as natural language commands. The operations of the system 200 are described in additional detail with regard to FIG. 3 below.

Illustrative Processes

Figure 3:
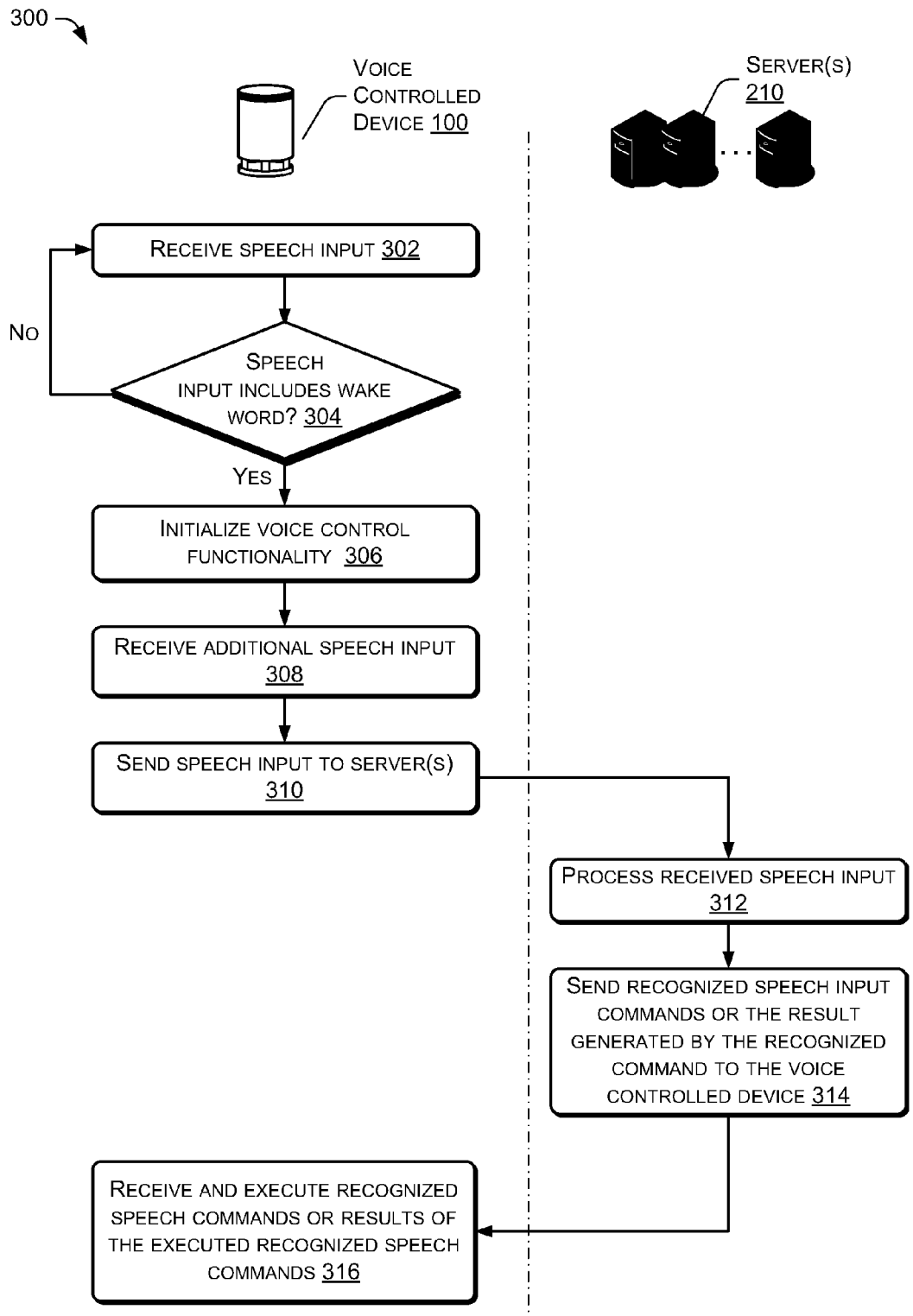
FIG. 3 shows selected components of the system of FIG. 2 and data flow among those components.

FIG. 3 shows an example process 300 illustrating the use of wake words to activate a voice control functionality of a device. The process 300 may be implemented by the voice controlled device 100 and server(s) 210 of FIG. 2, or by other devices. This process is illustrated as a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

For purposes of describing one example implementation, the blocks are arranged visually in FIG. 3 in columns beneath the voice controlled device 100 and server(s) 210 to illustrate that these devices of the system 200 may perform these operations. That is, actions defined by blocks arranged beneath the voice controlled device 100 may be performed by the voice controlled device 100, and similarly, actions defined by blocks arranged beneath the server(s) 210 may be performed by one or more server(s) 210.

At 302, the voice controlled device 100 receives speech input at the microphone(s) 130. At 304, the wake word recognition module 109 of the voice controlled device 100 may determine whether the speech input received at the microphone includes a wake word. As mentioned above, the speech recognition may be performed using any number of conventional speech recognition techniques such as use of hidden Markov models, Gaussian mixture models, natural language processing and/or extensive lexicons to interpret the voice input to determine if it includes a wake word. If not (i.e., the "no" branch from 304), the process 300 returns to 302. Thus, the voice controlled device 100 remains passive and awaits the receipt of the wake word 216. If the speech input includes a wake word (i.e., the "yes" branch from 304), the process 300 continues to 306.

At 306, the local modules 206 may initialize the voice control functionality of the voice controlled device 100. Initializing the voice control functionality may include any operations for recognizing speech input received subsequent to the wake word, such as opening a network connection or initializing a speech recognition module. At 308, the voice controlled device 100 receives additional speech input at the microphone(s) 130. At 314, the local modules 206 of the voice controlled device 100 send the speech input to the server(s) 210 for speech recognition. While the additional speech input is shown in FIG. 2 (i.e. the natural language command portion of 216) as being spoken with and after the wake word, some implementations may buffer the audio input before and after the wake word 216 to allow for variations. For example, the user may say, "Open my e-mail, {Wake Word}" and the system 200 could recognize the buffered audio input recorded prior to the wake word 216 as a command to open the user's e-mail. In other implementations, the user may speak the wake word separate from the natural language command. For example, in some implementations, the user may speak the wake word, the voice controlled device 100 may output an indication that it has been activated, and the user may then speak the natural language command. Further, while the voice controlled device 100 is shown to send the speech input in general to the cloud services 202, in other implementations, the voice controlled device 100 may send a subset of the speech input, such as the additional speech input (i.e. the natural language command portion of 216).

At 312, the server(s) 210 may receive and process the speech input received from the voice controlled device 100. As mentioned above, the speech recognition functionality, and particularly the command recognition functionality, may be performed using any number of conventional speech recognition techniques such as use of acoustic models, language models, and/or natural language processing. In some implementations, a command in the speech input may be executed by the cloud services 202 and a result of the command may be returned to the voice controlled device 100.

At 314, the server(s) 210 send the recognized speech input commands (or the result of processing the commands) to the voice controlled device 100. At 316, the local modules 206 receive and execute the received recognized speech commands or receive and utilize the received result of the recognized speech commands accordingly.

The technique described above and illustrated in FIG. 3 is merely an example and implementations are not limited to this technique. Rather, other techniques for operating the device 100 and system 200 using a wake word may be employed and the implementations of the system disclosed herein are not limited to any particular technique.

Figure 4:
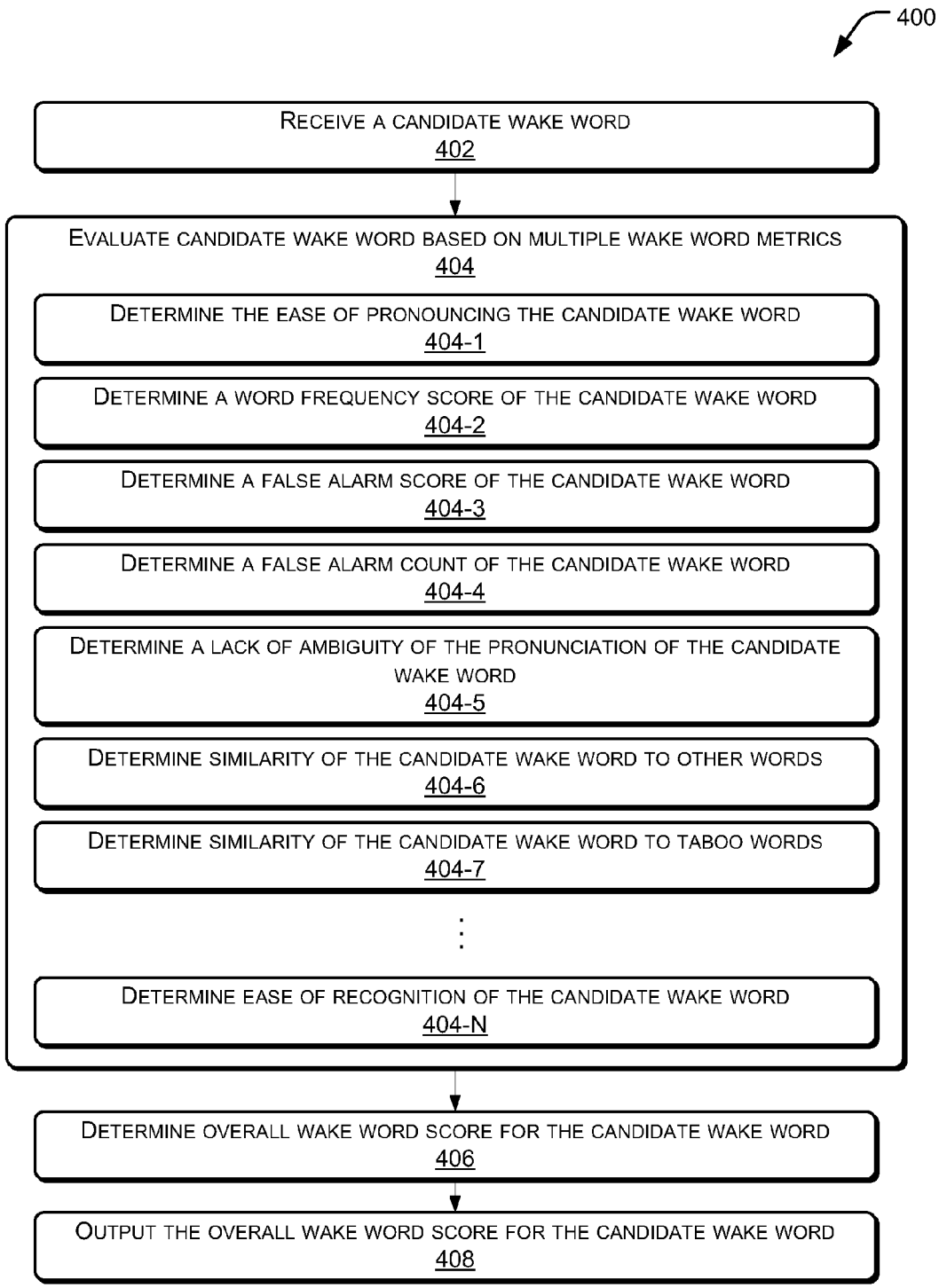
FIG. 4 shows an example process for evaluating candidate wake words.

FIG. 4 shows an example process 400 for evaluating candidate wake words for use in activating the voice control functionality of a device, such as the voice controlled device 100. The process 400 may be implemented by the wake word evaluation module 108 of the voice controlled device 100 of FIG. 1, the wake word evaluation module 108 of server(s) 210 of FIG. 2, or by other devices.

At 402, the wake word evaluation module 108 receives at least one candidate wake word to be evaluated. As discussed previously, wake words, and therefore candidate wake words, may be one or more words, phrases, sounds, etc. Further, candidate wake words may also be less than a complete wake word. For example, in implementations that employ phrases as wake words, the candidate wake word may only be a part of the phrase. For example, the wake word (phrase) in an implementation may be "wake up, {candidate}" such that only the portion represented by {candidate} is customizable. In such a case, some implementations may only evaluate the {candidate} portion of the candidate wake word. Candidate wake words may be received in any suitable form, such as in the form of text data, audio data, etc.

At 404, the wake word evaluation module 108 evaluates the candidate wake word to determine a plurality of wake word metrics. The values of the wake word metrics may provide an indication of the suitability of a particular candidate word to act as a wake word for a natural language controlled device. Some example metrics are provided in blocks 404-1 to 404-N.

At 404-1, the wake word evaluation module 108 determines an ease of pronunciation metric for the candidate wake word. In particular, the wake word evaluation module 108 may determine an ease of pronouncing the candidate wake word in one or more languages. This determination may be based on one or more rules or constraints of pronunciation of the subject language or languages. Additional detail of determining the ease of pronunciation metric is provided below with respect to FIG. 5.

At 404-2, the wake word evaluation module 108 determines a word frequency score metric for the candidate wake word. In some implementations, a value of the word frequency score metric may reflect how rarely (or frequently) the candidate wake word appears in speech or other usage, as measured by a count of the occurrences of the candidate wake word in a large corpus of English or other subject language, (e.g. billions of sentences from corpora such as voicemail transcriptions, Twitter, Wikipedia, and other sources). In some implementations, the word frequency score metric may be normalized from 0 to 1 where 1 is rarest; and where a higher score is more preferable. As such, some implementations may rate the word "Harmonica," a relatively rare word in some corpora, as considerably closer to one (1) than "Friday," which may be relatively common in some corpora.

At 404-3, the wake word evaluation module 108 determines a false alarm score metric for the candidate wake word. At 404-4, the wake word evaluation module 108 determines a false alarm count metric for the candidate wake word. Generally speaking, the false alarm score metric and false alarm count metric may reflect the relative distinctiveness of the sounds of the candidate wake word compared to likely sound patterns in general speech or background noise. In some implementations, the test data representing general speech or background noise may be based on a large number of utterances taken from real-life domains such as a voicemail collection. The value of the false alarm score metric may be computed by performing speech recognition on test data with a large-vocabulary speech recognition system, a phoneme recognizer, or a phrase model for the wake word. For example, the value of the false alarm score may measure the average per-utterance minimum distance of a candidate wake word's phone sequence to phone sequences generated by speech recognition on the utterances of a test set. As used herein, the phone sequence of a word or phrase may refer to the series of sounds that make up the word or phrase, for example, the four sounds "S" "OW" "L" "OW" are the phone sequence of the word "Solo." The distance measurements between the candidate wake word and the test utterances may be performed using any of a number of phonetic distance determination techniques, such as those used in phonetic confusability prediction and scoring. While "phones" are used as example subword units in the example implementations discussed herein, other subword units may be used. Other example subword units include phonemes, triphones, diphones, syllables, or parts of syllables, or whole-word models.

In some implementations, the false alarm score metric may not be a normalized value since the addition of syllables to a given word or phrase may increases the false alarm score (e.g. makes the given word or phrase more phonetically distinct). Thus, in a typical test set, the term "harmonica" may win over many the other candidates wake words because "harmonica" is a relatively long word with a relatively high number of syllables.

The false alarm count metric is similar to the false alarm score metric but differs in that, rather than determining the average minimum phonetic distance, the value of the false alarm count metric reflects the number of times the candidate wake word's specific phone sequence appears in the test utterance data. In other words, the false alarm count metric may measure the number of times the candidate wake words phone sequence itself appears in the test utterance data. Additional details of the determination of the false alarm score metric and the false alarm count metric is provided below with respect to FIG. 6.

At 404-5, the wake word evaluation module 108 determines a metric indicative of a lack of ambiguity of the pronunciation of the candidate wake word. In general, this metric may measure or reflect the uncertainty of a pronunciation for the candidate wake word. In some implementations, a pronunciation generation tool, such as those conventionally known, may be utilized to generate possible pronunciations for the word along with a confidence measure for each possible pronunciation. One technique to measure the lack of ambiguity of the pronunciation of the candidate wake word may be obtained as a count of a number of possible pronunciations that have a high confidence measure. If only one (1) possible pronunciation is a high confidence pronunciation, then the lack of ambiguity of the pronunciation of the candidate wake word may be evaluated as high. If the possible pronunciation generation tool produces multiple possible pronunciations that are high confidence pronunciations or if it does not produce any high confidence pronunciations, then the lack of ambiguity of the pronunciation of the candidate wake word may be evaluated as low. Many other possible techniques for implementing the evaluating of the lack of ambiguity of the pronunciation of the candidate wake word may be used and the implementations are not limited to any particular technique.

At 404-6, the wake word evaluation module 108 determines a metric indicative of a similarity of the candidate wake word to other words. As with the false alarm metrics, the similarity of the candidate wake word to other words may be determined using any phonetic distance determination technique such as those used in phonetic confusability prediction and scoring. In some implementations, the wake word evaluation module 108 may provide a value for the metric and a list of words that are most similar to a candidate wake word. For example, a list of similar words to "coupler" may include: "suppler," "caliper," and "doubler." In various implementations, the other words against which the candidate wake word is evaluated for similarity may be 1) all words in a language or languages, 2) a list of words of a language or languages defined by a user, or 3) some other subset of words of a language or languages. In evaluating the value for this metric, some implementations may evaluate the candidate wake word based on 1) a number of similar words, e.g. such as words with a threshold level of similarity, and 2) the level of similarity to the similar words. Thus, some implementations may give a higher value to candidate wake words with few similar words and whose similar words are not highly similar. Also, such implementations may assign a lower value to candidate wake words with many similar words and who have a high degree of similarity to those similar words. Many possible particular techniques for implementing the evaluating of the similarity of the candidate wake word to other words may alternatively be used and the implementations are not limited to any particular technique.

At 404-7, the wake word evaluation module 108 determines a metric indicative of a similarity of the candidate wake word to one or more taboo words. A taboo word is a word that is considered socially insensitive or contextually inappropriate for a situation, culture, language, and so forth. Swear words, racial slurs, inflammatory words, and the like are examples of taboo words. As with the similarity to other words metric, the similarity of the candidate wake word to one or more taboo words may be determined using any phonetic distance determination technique such as those used in phonetic confusability prediction and scoring. In particular, this metric may determine a phonetic distance score for the candidate wake word for each taboo word in a list of configurable list of taboo words. Many possible particular techniques for implementing the evaluating of the similarity of the candidate wake word to such taboo words would be apparent to one of ordinary skill in the art in view of this disclosure and the implementations are not limited to any particular technique.

At 404-N, the wake word evaluation module 108 determines a metric indicative of an ease of recognizing the candidate wake word with an automatic speech recognition system. For example, this metric may provide a value based on a rough fit of an acoustic model to the sounds in the candidate wake word. The acoustic model utilized may be the same or similar to that utilized in determining the false alarm metrics. The specific factors that are utilized to determine the ease of recognizing the candidate wake word may vary from implementation to implementations and language to language. Some example criteria or factors used in some implementations for recognizing English words may include:
 1. The candidate wake word should be dissimilar to other common words and phone sequences in typical speech.
 2. Consonant clusters (e.g. 'str') make words easier to recognize with fewer false alarms.
 3. Vowels and consonants that have longer durations (e.g. f, v, th, ch, m, n) may be easier to recognize over background noise.

In operation, these factors may be evaluated and combined to determine the value of the metric indicative of an ease of recognizing the candidate wake word.

In other implementations, the ease of recognizing the candidate wake word may be performed using experimental test data. For example, for a given candidate wake word, audio test data can be generated by users speaking the candidate wake word in phrases similar to those used to operate of the device. Various background noises and/or general background speech data could be included in the audio test data. The audio test data could then be analyzed to determine the ease of recognizing the candidate wake word in the audio test data.

These and other possible particular techniques for implementing the evaluation of the ease of recognizing the candidate wake word may be used and the implementations are not limited to any particular technique.

The various techniques 404-1 to 404-N for evaluating candidate wake words are merely representative and are not intended to cover a comprehensive list, nor be limiting in any manner. Many other implementations of these techniques, as well as additional techniques may be used in addition to, or in the alternative.

After determining a given set of wake word metrics, the values of the wake word metrics are output for evaluation.

At 406, the wake word evaluation module 108 receives values of the wake words metrics determined at 404 and determines an overall wake word score based on the values for the wake word metrics determined in actions 404-1 to 404-N. The particular calculation of the overall wake word score is not limited. For example, in some implementations, the overall wake word score may be a weighted calculation in which specific metrics are assigned different degrees of importance in determining the overall wake word score. However, the details of a given implementation may dictate the specific calculation. For example, in an implementation in which a particular wake word is used by all users of a device, the candidate wake word evaluation may emphasize the similarity to taboo words, the lack of ambiguity of pronunciation of the candidate wake word, and the ease of pronunciation metrics (or the ease of pronouncing the candidate wake word in multiple languages where the wake word is to be used by devices in multiple countries or by speakers of the multiple languages). On the other hand, in implementations in which the wake word of a device is user specified or chosen from a list, the candidate wake word evaluation may emphasize the false alarm metrics and place less emphasis on the similarity to taboo words and word frequency metrics. In implementations which the user verbally specifies the candidate wake word to be evaluated, the lack of ambiguity in the pronunciation of the candidate wake word may be given less emphasis as the pronunciation that will be used by the user is known from the user's verbal input. Other variations in the weighting of the individual values of the metrics are possible.

At 408, the wake word evaluation module 108 outputs the overall wake word score and possibly the values of the individual metrics determined in actions 404-1 to 404-N. The score and the values of the metrics may then be used to choose a suitable wake word for use with the system, such as system 200. For example, a user may provide the system 200 with one or more candidate wake words. After determining an overall wake word score for each of the candidate wake words, the voice controlled device 100 may output the scores or values for the user. In some implementations, the voice controlled device 100 may output a ranking of the candidate wake words based on the overall wake word scores. In such implementations, the output could be an audio output, such as through the speakers 132, or visual output, such as by showing the scores and/or rankings on a user interface on a display of the voice controlled device 100. Alternatively, the output may be provided to an independent device, such as the user's cellular phone, tablet, or other computer for review. The system 200 may recommend a wake word with the highest overall score and/or the user may select an appropriate wake word from the list of wake words.

It should be noted that the above discussed wake words metrics are merely examples, are not exhaustive and thus particular implementations may not include all the above metrics, may include additional and/or different metrics, may include modified versions of the metrics discussed above and/or may include an entirely different set of metrics. For example, a metric could be included that reflects whether the candidate wake word has a consistent pronunciation across age levels, regional dialects, and common accents.

In other implementations, the wake word evaluation module 108 may not determine an overall candidate wake word score or may base the determination on a subset of the metrics. In such implementations, the wake word metrics and any additional combined metrics may be output to allow for a user of the wake word evaluation system to make an overall determination of the suitability of the candidate wake word for use as a wake word.

Figure 5:
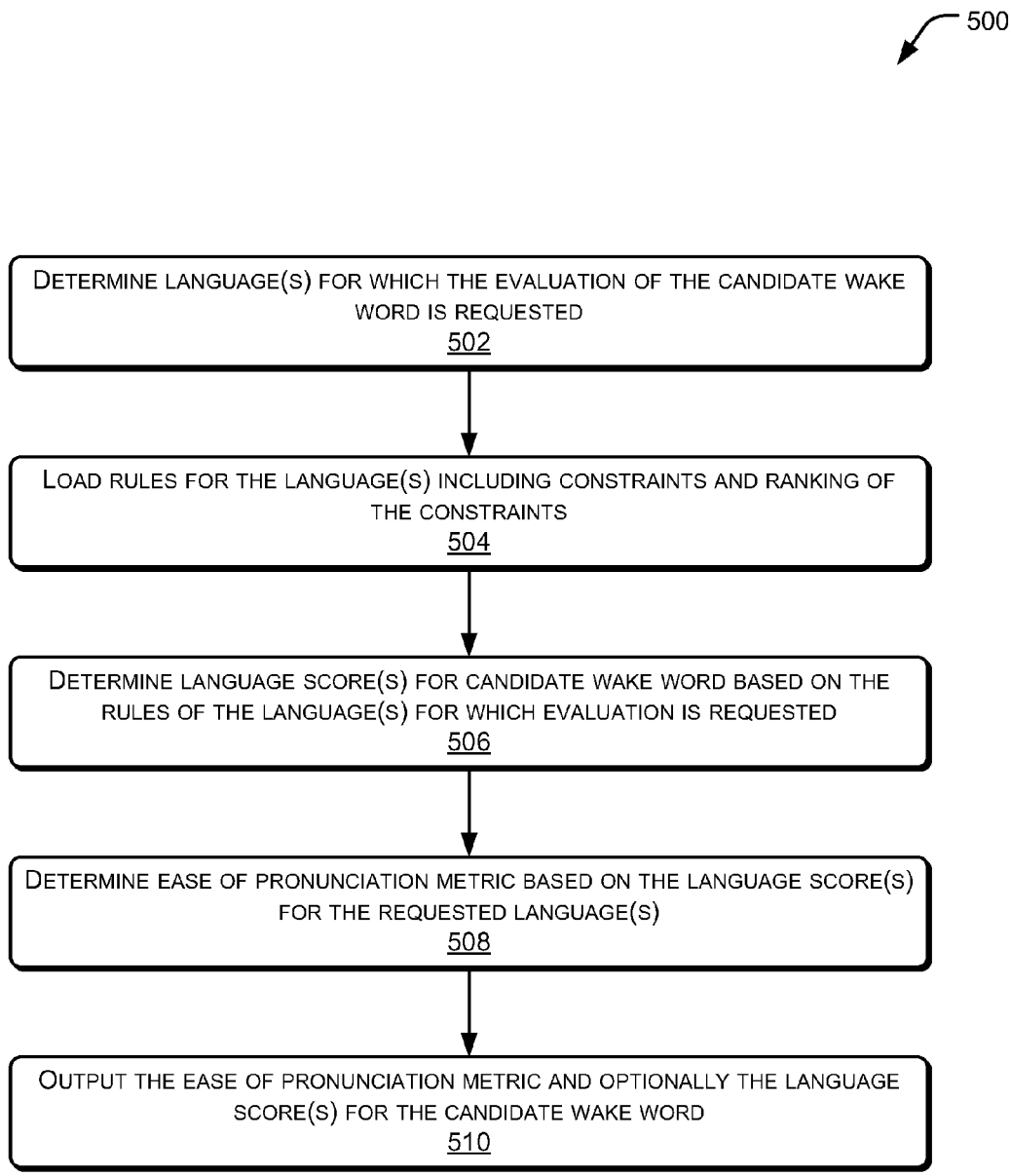
FIG. 5 shows an example process for determining a value of an ease of pronunciation metric of a candidate wake word.

FIG. 5 shows an example process 500 for determining the value of the ease of pronunciation metric of action 404-1 of FIG. 4. The process 500 may be implemented by the wake word evaluation module 108 of the voice controlled device 100 of FIG. 1, the wake word evaluation module 108 of server(s) 210 of FIG. 2, or by other devices.

At 502, the wake word evaluation module 108 determines the one or more languages for which evaluation of the ease of pronunciation of the candidate wake word is requested. The one or more languages for which evaluation of the candidate wake word is requested may be predefined, defined for the particular candidate wake word when evaluation of the candidate wake word is requested, defined for a plurality of candidate wake words when evaluation of the plurality of candidate wake words is requested, etc.

At 504, the wake word evaluation module 108 loads rules for the one or more languages. In some implementations, these rules may be language specific and thus each language may have a corresponding set of rules that is loaded. In some implementations, the rules for each language may include constraints on how syllables are structured and an associated ranking of the constraints. More particularly, in some implementations, the constraints may be reflective of how syllables are structured in a particular language and which syllables are permitted in the particular language. Further, in some implementations, the same constraints may be used for each language, but each language may give the constraints different priorities. Thus, different kinds of syllables may appear in different languages or have a differing ease of pronunciation in those languages.

As used in some implementations, there may be a set of constraints shared by the languages. In such implementations, each language may have all the constraints but, as mentioned above, different languages give these constraints different priorities. For example, according to some implementations, many languages may have a constraint which disprefers consonants at the ends of syllables. However, in some languages (e.g. English), the constraint may be very weak (or low-ranked), but in other languages (e.g. Hawaiian), it is very strong (or high-ranked). Thus, because of the relative ranking of the constraint against consonants at the ends of syllables, the term "cat" may be assigned a high ease of pronunciation value for English, but a low ease of pronunciation value for Hawaiian.

In some implementations, the ease of pronunciation of a candidate wake word for a given language is based on (1) the constraints the candidate wake word violates, and (2) the relative ranking of the violated constraints in that language.

Implementations are not limited to any particular set of constraints. However, for convenience and for a more complete explanation of the constraints, below is a set of constraints used in some implementations, ordered according to their relative priority for the English language according to some implementations:

1. Syllables should contain vowels or vocalic versions of the sounds: r; l; m; and n.
2. Repeated consonants within a single syllable should be avoided.
3. The "ng" sound should be avoided before the vowel of a syllable.
4. The "h" sound should be avoided after the vowel of a syllable.
5. The "y" or "w" sounds should be avoided after the vowel of a syllable.
6. The occurrence of two consonants in a cluster before the vowel of a syllable should be avoided if both are in the list of: d; t; z; j; n; l; th; ch; sh; or are "sr".
7. Affricates (e.g., "ch" or "j") should be avoided in consonant clusters before the vowel of a syllable.
8. The consonants in the following list should be avoided as the initial consonant of a cluster before the vowel of a syllable: z; v; zh; th (voiced); r; l; m; n; y; and w.
9. The occurrence of the "h" sound in a cluster before the vowel of a syllable should be avoided.
10. The occurrence of the "sh" sound in a cluster before the vowel of a syllable should be avoided.
11. Consonants prior to the vowel of a syllable should appear in this order: p; t; k; b; d; g; j; s; t; f; z; n; m; r; l; w; y.
12. Consonants after the vowel of a syllable should appear in roughly this order: y; w; l; r; m; n; z; f; s; j; g; d; b; k; t; p.
13. The occurrence of "y" immediately following "n", "m", or "ng" should be avoided.
14. The occurrence of consonants after the vowel in a syllable should be avoided.
15. The occurrence of non-nasal consonants (e.g., m, n, ng) after the vowel in a syllable should be avoided.
16. The final consonant of a cluster before the vowel of a syllable should be r, l, y, or w.
17. The occurrence of clustered consonants before the vowel of the syllable should be avoided.
18. The first consonant of a cluster before the vowel of a syllable should be p, t, k, b, d, g, or f.
19. The second consonant of a cluster before a vowel should be l or r.
20. The occurrence of clusters after the vowel of a syllable should be avoided.

As previously mentioned, the above constraints are ordered according to the priority of the rules for the English language in some implementations. For comparison, in some implementations, the ordering of these constraints for Japanese may be: 1; 2; 3; 4; 5; 14; 17; 6; 11; 12; 15; 13; 7; 8; 9; 10; 16; 18; 19; 20. Thus, for example, constraints 14 and 17 have a much higher priority in Japanese than in English.

It should be noted that the above list of constraints is merely an example, is not exhaustive. Thus, particular implementations may not include all the above constraints, may include additional and/or different constraints, and/or may include an entirely different set of constraints. Further, in some implementations, the constraints may be defined differently and/or in phonological terminology. For example, rule 11 may be restated as, "Onset consonants should appear in order of increasing sonority." Accordingly, implementations are not limited to any specific manner of defining or stating constraints. Put another way, the constraint set and ordering may depend on or be formed according to the linguistic theory to which a given system designer may subscribe and the phraseology and/or terminology may similarly vary.

Additionally, in some implementations, the ordering of some of the constraints may be more important than other constraints. Further, in some cases, the ordering of two constraints may not be defined for a given language. For example, in English, constraints 3-5 may not need to be ordered relative to each other in any specific manner, but should all be ranked above constraint 10. In other words, in such implementations, constraints 3-5 are of roughly equal priority but all have a higher priority than constraint 10.

Returning to FIG. 5, at 506, once the rules for the one or more languages are loaded, the wake word evaluation module 108 may determine a language value for the candidate wake word for each language based on the loaded rules of the language. For example, the language value for a given language may be determined based on the number of constraints the candidate wake word violates weighted by the relative ranking of the violated constraints in that language. Many possible particular techniques for implementing the determination of the language value of the candidate wake word for each language words would be apparent to one of ordinary skill in the art in view of the above discussion of the constraints and this disclosure as a whole. As such, the implementations are not limited to any particular technique.

At 508, the wake word evaluation module 108 may determine the value of the ease of pronunciation metric based on the one or more language values that correspond to the requested language(s). Depending on the details of the implementation, different languages may be given different priorities and thus, different language values may be weighted according to the priority assigned to the corresponding language in the particular implementation. In such implementations, the ease of pronunciation metric may be determined as a weighted average of the one or more language values. However, implementations are not limited to any particular calculation. Many possible techniques for implementing the determination of the ease of pronunciation metric based on the one or more language values of the candidate wake word would be apparent to one of ordinary skill in the art in view of this disclosure. As such, the implementations are not limited to any particular technique.

At 510, the wake word evaluation module 108 may output a value for the ease of pronunciation metric. In some implementations, the wake word evaluation module 108 may also output the one or more language values for the candidate wake word. In such a case, a user of the candidate wake word evaluation system may review the individual values and may override or modify the value of the ease of pronunciation metric based on such manual review.

The technique described above and illustrated in FIG. 5 is merely an example and as such implementations are not limited to this technique. Rather, other techniques for determining an ease of pronunciation metric would be apparent to one of ordinary skill in the art in view of this disclosure and the implementations of the system disclosed herein are not limited to any particular technique.

Figure 6:
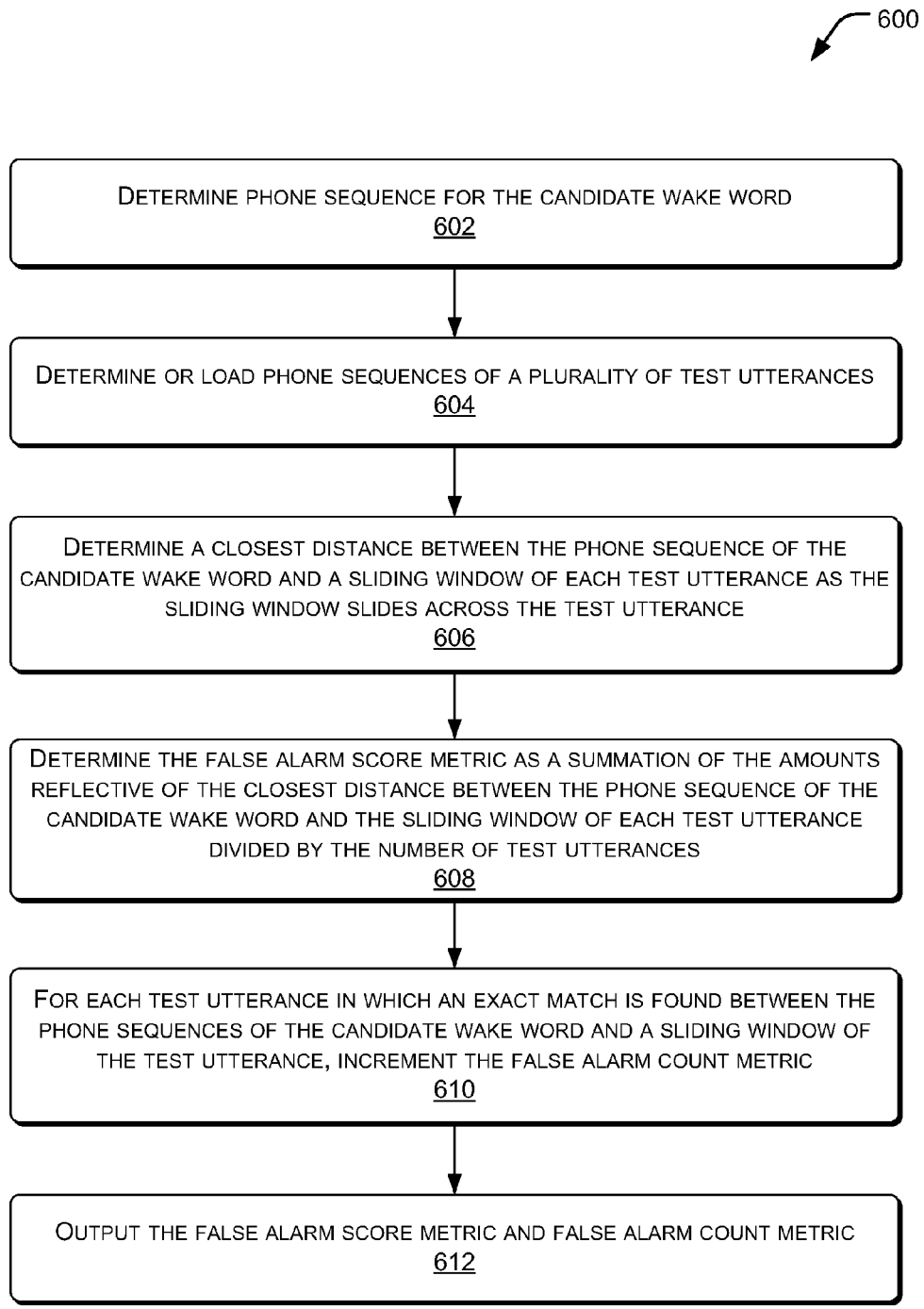
FIG. 6 is a flow diagram showing an illustrative process for determining a value of a false alarm score metric and a value of a false alarm count metric.

FIG. 6 shows an example process 600 for determining the values of the false alarm score metric and false alarm count metric of actions 404-3 and 404-4 of FIG. 4. The process 600 may be implemented by the wake word evaluation module 108 of the voice controlled device 100 of FIG. 1, the wake word evaluation module 108 of server(s) 210 of FIG. 2, or by other devices.

At 602, the wake word evaluation module 108 determines a phone sequence corresponding to the candidate wake word to be evaluated. As discussed above, the phone sequence of a word or phrase may refer to the series of sounds that make up the word or phrase. In some implementations, the phone sequence may be determined using a lexicon including word/pronunciation pairs for known words and a pronunciation "guesser" for new words. In some implementations, the phone sequence could also be determined from speech data corresponding to the candidate wake word, for example where the pronunciation is non-standard or to determine false alarm metrics for phone sequences that are generated by a speech recognizer for different speakers.

At 604, the wake word evaluation module 108 determines or loads phone sequences of a plurality of test utterances. For example, the test utterances may be speech recognizer output or "truth" transcripts. The speech recognizer output may include alternative hypotheses (as sequences of words or phones) in the form of a lattice or an N-best list. The truth transcript may be supplemented with likely phone or word errors, and the likely phone or word errors may be generating using a phoneme confusion matrix. A phoneme confusion matrix may indicate a probability (or other value) that a phoneme is incorrectly recognized as another phoneme by a speech recognition system, and may also include probabilities that a phoneme is erroneously inserted or deleted by a speech recognition system. In some implementations, the value of the false alarm score metric and the value of the false alarm count metric may be calculated for a plurality of candidate wake phrases at a time, but here it is only discussed as being calculated for one candidate wake phrase at a time for clarity.

At 606, the wake word evaluation module 108 determines a closest distance between the phone sequence of the candidate wake word and a sliding window of each test utterance (possibly including multiple hypotheses or likely errors), i.e. as the sliding window slides across the test utterance. In a particular example, a test utterance may include a phone sequence with a plurality of phones, e.g. thirty (30) phones. In the case of the candidate wake word being a four phone sequence, the sliding window size may be set to four phones. In operation, a distance may be evaluated between the phone sequence of the candidate wake word and each consecutive four phone sequence of the test utterance. As such, a distance may be evaluated for the sequence of the first, second, third and fourth phones of the test utterance. Another distance may be calculated for the sequence of the second, third, fourth and fifth phones of the test utterance. A third distance would be evaluated for the third, fourth, fifth and sixth phones of the test utterance. This process would continue for each four phone sequence up to the sequence including the twenty-seventh, twenty-eighth, twenty-ninth and thirtieth phones of the test utterance. The distance or alignment between the phone sequences may not be just a Euclidean distance between the phone sequences. Rather, the distance may be an optimal alignment determined by Dynamic Time Warping or Levenshtein Distance. For example, the Levenshtein distance may align correct words (or subword units) in a hypothesis with correct words (or subword units) of the transcription and determine the number of errors in a recognition hypothesis, where errors may be referred to as substitutions, insertions, and deletions. In some implementations, a phone confusability matrix may be utilized in the calculation. In some implementations, the distance or alignment for the test utterance may be scaled such that a small value is returned when the best phonetic match between the wake word and a phonetic sequence in the utterance may be very similar and a relatively large value may be returned when they are dissimilar.

At 608, a value of the false alarm score metric is determined based on the calculated amounts reflective of the closest distance between the phone sequence of the candidate wake word and the sliding window of each test utterance. In some implementations, the false alarm score metric may be determined as the summation of the amounts reflective of the closest distance between the phone sequences of the candidate wake word each test utterance divided by the number of test utterances.

At 610, the value of the false alarm count metric is determined based on the calculated closest phonetic distances. In some implementations, for each test utterance in which an exact match is found between the phone sequence of the candidate wake word and the sliding window of the test utterance, the value of the false alarm count metric is incremented by one. In other words, the false alarm count may be equal to the number of test utterances including a phone sequence that is an exact match to the phones of the candidate wake word. However, implementations are not limited to determining the false alarm count metric based on exact matches. In other implementations, for each test utterance in which a close match is found between the phone sequence of the candidate wake word and a phone sequence in the sliding window of the test utterance, the value of the false alarm count metric may be incremented by one. In still other implementations, both an exact match count and a "near miss" count are determined. In such an implementation, the value of the metric may be the two counts or a weighted calculation may be performed to determine the value of the false alarm count metric.

At 612, the wake word evaluation module 108 may output the values of the false alarm score metric and false alarm count metric. These values may be used by the wake word evaluation module 108 to determine the overall wake word score of the candidate wake word or the values may be used by a user of the candidate wake word evaluation system may review the values of the individual metrics to determine the suitability of the candidate wake word to be used as a wake word.

The technique described above and illustrated in FIG. 6 is merely an example and implementations are not limited to this technique. For example, as discussed above, some implementations may utilize subword units other than phones. Other techniques for determining the false alarm score metric and false alarm count metric would be apparent to one of ordinary skill in the art in view of this disclosure and the implementations of the system disclosed herein are not limited to any particular technique.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing system comprising:
   one or more processors;
   one or more computer-readable storage media storing computer-executable instructions;
   a speech recognition module maintained in the one or more computer-readable storage media and executed by the one or more processors to interpret a signal representing the audio input as one or more words; and
   a wake word evaluation module maintained in the one or more computer-readable storage media and executed by the one or more processors to:
      receive a plurality of candidate wake words for evaluation, wherein the plurality of candidate wake words comprises a first candidate wake word;
      obtain a corpus of text for evaluating the plurality of candidate wake words;
      obtain a corpus of audio data for evaluating the plurality of candidate wake words;
      perform speech recognition on the corpus of audio data using the speech recognition module to obtain speech recognition results;
      determine a plurality of values from wake word metrics for the first candidate wake word using at least one of the corpus of text or the speech recognition results, at least one of the plurality of values including a value indicative of an ease of pronouncing the first candidate word;
      determine an overall score for the first candidate wake word based at least in part on the plurality of values; and
      select a first wake word from the plurality of candidate wake words using the overall score.

2. The system as recited in claim 1, wherein the wake word evaluation module is further executable by the one or more processors to:
   select a second wake word from the plurality of wake word candidates using the overall score.

3. The system as recited in claim 1, wherein the plurality of values for the first candidate wake word comprise one or more of:
   a value indicating an ease of pronouncing the first candidate wake word;
   a value indicating a false alarm count for the first candidate wake word;
   a value indicating a lack of ambiguity of a pronunciation of the first candidate wake word;
   a value indicating a similarity of the first candidate wake word to one or more other words; or
   a value indicating a similarity of the first candidate wake word to taboo words.

4. The system as recited in claim 1,
   wherein the plurality of wake word values for the first candidate wake word include a word frequency value that indicates a frequency of occurrence of the first candidate wake word in the corpus of text.

5. The system as recited in claim 1, wherein the plurality of wake word values for the first candidate wake word include a false alarm value, wherein the false alarm value is computed by comparing a phone sequence of the first candidate wake word to a plurality of phone sequences obtained from the speech recognition results.

6. A method comprising:
   under control of one or more computer systems configured with executable instructions,
   receiving an audio input including a first candidate word for evaluation as a wake word that activates functionality of a computing device;
   determining a plurality of values from wake word metrics for the first candidate word, at least one of the plurality of values including a value indicative of an ease of pronouncing the first candidate word; and determining an overall score for the first candidate word based at least in part on the plurality of values.

7. The method as recited in claim 6, wherein the plurality of values includes a false alarm score value that is determined for the first candidate word by:
  determining a phone sequence of the first candidate word;
  comparing the phone sequence of the first candidate word to one or more phone sequences corresponding to speech recognition results; and
  determining the false alarm score value based at least in part on the comparison.

8. The method as recited in claim 7, wherein the comparing the phone sequence of the first candidate word to one or more phone sequences corresponding to speech recognition results includes determining an average per-utterance minimum distance match determined by:
  for one or more test utterances, determining a plurality of distance matches for each of the test utterances, each distance match corresponding to a distance match between a respective sequence of consecutive phones of a plurality of sequences of phones of the corresponding test utterance to the phone sequence of the first candidate word;
  determining a minimum distance match for each of the test utterances; and
  determining an average of the minimum distance matches of the test utterances.

9. The method as recited in claim 8, wherein at least two respective consecutive sequences of phones of a test utterance for which a distance match is determined overlap.

10. The method as recited in claim 6, wherein the value indicative of the ease of pronunciation of the first candidate wake word is determined at least in part by determining a number of constraints on syllables in a language that the candidate word violates.

11. The method as recited in claim 10, wherein the value indicative of the ease of pronunciation of the candidate word is further determined at least in part by a weighting of each of the constraints violated by the candidate word.

12. The method as recited in claim 10, wherein the metric indicative of the ease of pronunciation of the candidate word is further determined at least in part by determining a number of constraints on syllables in a second language that the candidate word violates.

13. The method as recited in claim 6, wherein the plurality of values includes at least one of:
  a value indicative of a similarity of the first candidate word to a plurality of other words of a language, the similarity to the plurality of other words of the language being determined based on a comparison between a phone sequence of at least one of the other words to a phone sequence of the first candidate word; and
  a value indicative of a similarity of the first candidate word to one or more taboo words, the similarity to the one or more taboo words being determined based on a comparison between a sequence of phones of at least one of the taboo words and the phone sequence of the first candidate word.

14. The method as recited in claim 13, wherein a phoneme confusion matrix is used to determine at least one of (1) the comparison between the phone sequence of at least one of the other words to the phone sequence of the first candidate word or (2) the comparison between the phone sequence of at least one of the taboo words to the phone sequence of the first candidate word.

15. A method comprising:
  under control of one or more computer systems configured with executable instructions,
  receiving an audio input including a first candidate word for evaluation as a wake word that activates functionality of a computing device;
  determining a plurality of values from wake word metrics for the first candidate word, wherein the plurality of values includes a false alarm count value that is determined for the first candidate word by:
    comparing a phone sequence of the first candidate word to a plurality of phone sequences obtained from speech recognition results;
    determining a match for each of the plurality of phone sequences obtained from speech recognition results; and
    determining a count of phone sequences obtained from speech recognition results that have a match below a threshold level; and
  determining an overall score for the first candidate word based at least in part on the plurality of values.

16. The method as recited in claim 15, wherein the match is a minimum distance match.

17. The method as recited in claim 16, wherein the count is a first count and the threshold level is a first threshold level and wherein the first threshold is indicative of an exact match;
  the method further comprising determining a second count of phone sequences that have a minimum distance match below a second threshold level, the second threshold level being indicative of a less than exact match.

18. A method comprising:
  under control of one or more computer systems configured with executable instructions,
  receiving an audio input including a first candidate word for evaluation as a wake word that activates functionality of a computing device;
  determining a plurality of values from wake word metrics for the first candidate word, wherein the plurality of values includes a word frequency value that is determined for the first candidate word by determining a frequency of occurrence of the first candidate word in a test set comprising one or more words; and
  determining an overall score for the first candidate word based at least in part on the plurality of values.

19. The method as recited in claim 18, wherein the word frequency value is normalized to value between one and zero.

20. The method as recited in claim 18, wherein the one or more words of the test set is associated with at least one of voicemail transcriptions, online posts, or dictionary entries.

21. A computing system comprising:
  one or more processors;
  one or more computer-readable storage media storing computer-executable instructions;
  a wake word evaluation module maintained in the one or more computer-readable storage media and executed by the one or more processors to:
    receive a candidate word for evaluation as a wake word that activates functionality of a computing device, the candidate word received as an audio input;
    determine a plurality of values from wake word metrics for the candidate word, at least one of the plurality of values including a word frequency value; and
    determine an overall score for the candidate wake word based at least in part on the plurality of values.

22. The system as recited in claim 21, wherein the plurality of values includes a false alarm score value that is determined for the candidate word by:

determining a phone sequence of the candidate word;
comparing the phone sequence of the candidate word to one or more phone sequences corresponding to speech recognition results; and
determining the false alarm score value based at least in part on the comparison.

23. The system as recited in claim 21, wherein the plurality of values includes at least one of:
a value indicative of a similarity of the candidate word to a plurality of other words of a language, the similarity to the plurality of other words of the language being determined based on a comparison between a phone sequence of at least one of the other words to a phone sequence of the candidate word; and
a value indicative of a similarity of the candidate word to one or more taboo words, the similarity to the one or more taboo words being determined based on a comparison between a sequence of phones of at least one of the taboo words and the phone sequence of the candidate word.

24. The system as recited in claim 23, wherein a phoneme confusion matrix is used to determine at least one of (1) the comparison between the phone sequence of at least one of the other words to the phone sequence of the candidate word or (2) the comparison between the phone sequence of at least one of the taboo words to the phone sequence of the candidate word.

25. The system as recited in claim 21, wherein the plurality of values includes a value indicative of an ease of pronouncing the first candidate word.

26. A computing system comprising:
one or more processors;
one or more computer-readable storage media storing computer-executable instructions;
a wake word evaluation module maintained in the one or more computer-readable storage media and executed by the one or more processors to:
receive an audio input including a candidate word for evaluation as a wake word that activates functionality of a computing device;
determine a plurality of values from wake word metrics for the candidate word, wherein the plurality of values includes a word frequency value that is determined for the candidate word by determining a frequency of occurrence of the candidate word in a test set comprising one or more words; and
determine an overall score for the candidate wake word based at least in part on the plurality of values.

27. The computing system as recited in claim 26, wherein the word frequency value is normalized to value between one and zero.

28. The computing system as recited in claim 26, wherein the one or more words of the test set is associated with at least one of voicemail transcriptions, online posts, or dictionary entries.

29. A computing system comprising:
one or more processors;
one or more computer-readable storage media storing computer-executable instructions;
a wake word evaluation module maintained in the one or more computer-readable storage media and executed by the one or more processors to:
receive an audio input including a candidate word for evaluation as a wake word that activates functionality of a computing device;
determine a plurality of values from wake word metrics for the candidate word, wherein the plurality of values includes a value indicative of an ease of pronouncing the candidate word determined at least in part by determining a number of constraints on syllables in a language that the candidate word violates, wherein the determination includes a weighting of each of the constraints violated by the candidate word; and
determine an overall score for the candidate wake word based at least in part on the plurality of values.

30. One or more non-transitory computer-readable media having computer-executable instructions that, when executed by one or more processors, cause the one or more processors to perform operations comprising:
receiving an audio input including a candidate word for evaluation as a wake word that activates functionality of a computing device, the candidate word comprising a sequence of subword units;
determining a plurality of wake word values for the candidate word, at least one wake word value including a word frequency value; and
determining an overall value for the candidate word based at least in part on the plurality of wake word values.

31. The one or more computer-readable media as recited in claim 30, wherein at least one wake word value determined based, at least in part, on a comparison of the sequence of subword units of the candidate word to a sequence of subword units corresponding to a test data.

32. The one or more computer-readable media as recited in claim 31, wherein the comparison of the subword unit sequence of the candidate word to the one or more subword unit sequences corresponds to at least one of:
the test data comprises using a phoneme confusion matrix; or
the test data at least one test utterance is a Levenshtein distance.

33. The one or more computer-readable media as recited in claim 31, the operations further comprising:
generating the sequence of subword units corresponding to the test data using a speech recognition system and audio data.

34. The one or more computer-readable media as recited in claim 31, the operations further comprising:
generating the sequence of subword units corresponding to the test data using a pronunciation lexicon and text data.

35. The one or more computer-readable media as recited in claim 30, wherein the plurality of wake word values for the candidate wake word comprise one or more of:
a value indicating an ease of pronouncing the candidate wake word;
a value indicating a false alarm count for the candidate word;
a value indicating a lack of ambiguity of a pronunciation of the candidate wake word;
a value indicating a similarity of the candidate wake word to one or more other words;
a value indicating a similarity of the candidate wake word to taboo words; or
a value indicating an ease of recognizing the candidate wake word with a speech recognition system.

* * * * *